(No Model.)
W. A. CROWDUS.
GALVANIC BATTERY.
No. 463,248. Patented Nov. 17, 1891.
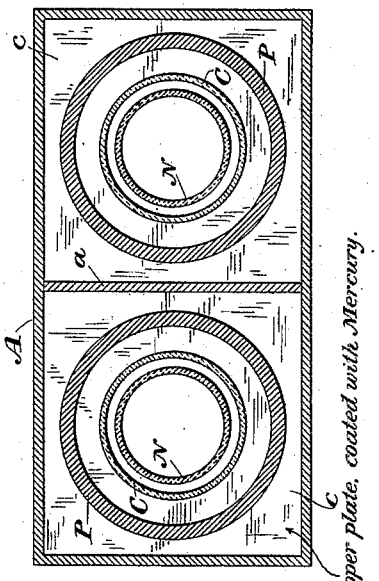
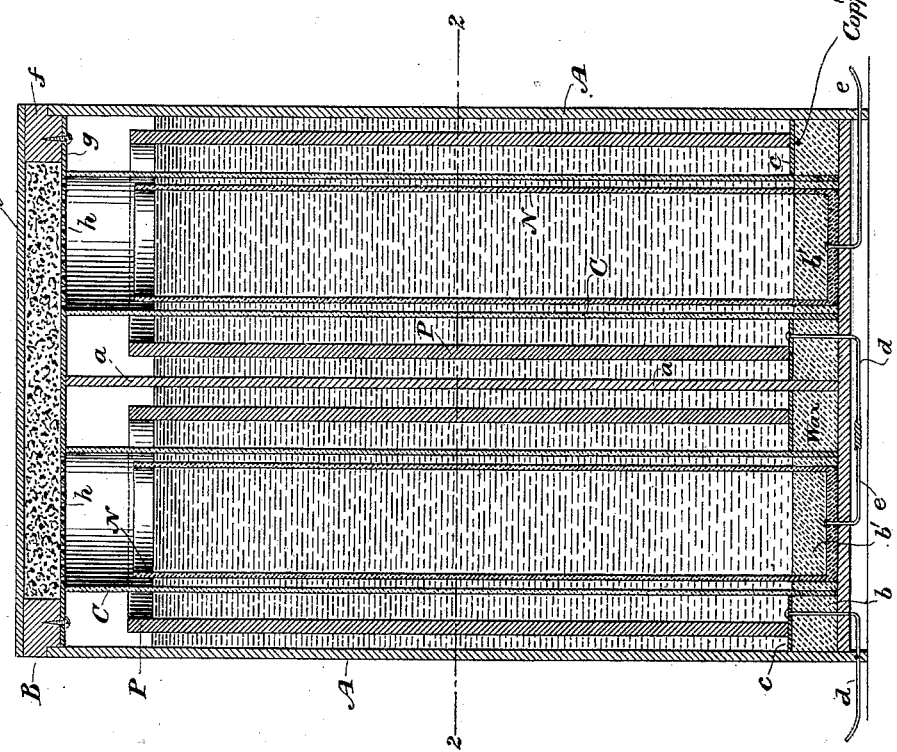
WITNESSES:
Geo. W. Breck
Saml. F. Macpeak
INVENTOR:
Walter Ambus Crowdus,
By his Attorneys,
Arthur C. Fraser & Co.

UNITED STATES PATENT OFFICE.

WALTER AMBUS CROWDUS, OF MEMPHIS, TENNESSEE, ASSIGNOR TO JO. W. ALLISON, TRUSTEE, OF SAME PLACE.

GALVANIC BATTERY.

SPECIFICATION forming part of Letters Patent No. 463,248, dated November 17, 1891.

Application filed January 24, 1891. Serial No. 378,873. (No model.)

*To all whom it may concern:*

Be it known that I, WALTER AMBUS CROWDUS, a citizen of the United States, residing in Memphis, Tennessee, have invented certain new and useful Improvements in Galvanic Batteries, of which the following is a specification.

This invention relates chiefly to two-fluid batteries, but is in part applicable to one-fluid batteries.

The invention introduces improvements designed to simplify and cheapen the porous cup, to destroy the fumes given off by batteries, and to provide improved submerged connections.

Figure 1 of the accompanying drawings is a vertical mid-section of a battery constructed according to my invention. Fig. 2 is a horizontal section thereof on the line 2 2 in Fig. 1. Fig. 3 is a plan view of the cover partly dissected or broken away to show its construction.

Referring to the drawings, let A designate the jar or containing-vessel of the battery, which in the construction shown is divided into two cells by a transverse partition $a$. The jar A is shown as constructed of thin wood suitably treated to render it impervious, but it may be made of any other suitable material. In the middle of each cell is placed the negative element N, which in this instance is of carbon in the form of a hollow cylinder or cup. Concentrically around and close to this cylinder is placed the porous cup C, which is preferably made as usual of porous or unglazed earthenware. In the space exterior to this cup or partition is placed the positive electrode P, which may be a sheet or cylinder of zinc. The battery-jar is closed on top by a cover B.

In two-fluid batteries, wherein the fluids are separated by a porous partition or diaphragm, it is customary whenever a concentric arrangement of the elements is adopted to construct this porous partition in the form of a cylindrical cup of unglazed earthenware. Such cups are objectionable because of the practical impossibility of molding them of uniform thickness so that their electric resistance varies over different portions of their surface, and consequently the electric current traversing the diaphragm is of unequal volume at different portions of its area. To overcome these defects I have devised a new form of porous partition. I make it in the form of a tube with both ends open, preferably a cylindrical tube; but this form may be departed from. By constructing it thus as an open-ended tube the potter may pass the mandrel or other instrument on which he molds the earthenware entirely through it, and by the use of suitable tools or devices he is enabled to mold it accurately of a uniform thickness from end to end and around its entire circumference at all portions, thereby giving it a uniform electrical resistance and uniform permeability admitting of uniform liquid diffusion at all points.

In constructing the battery the porous tube has its bottom end sealed in the bottom portion of the jar or cell. This is preferably done by flowing a layer of suitable wax—such as sealing-wax—over the bottom of the containing-jar, this layer of wax being shown at $b$. It is preferable to introduce a layer of wax in the bottoms of the carbon cups N, as shown at $b'$, thereby insulating the bottom of the carbon cup, this bottom portion being used not as a part of the electrode, but as a means of making electrical connection with it. The lower end of the porous earthenware tube is deeply and completely sealed in the wax, so that all possibility of leakage of the liquid around the bottom of the tube is avoided. The wax sealing layer serves also the function of securely fastening the carbon cylinder N in place. The cylinders N and C are concentric, so that the intervening space is of uniform thickness over their entire surface. Hence the resistance of the intervening layer or film of liquid is uniform.

In order to effect an electrical connection with the positive electrode or zinc plate P, it is made to rest on a flat plate or ring $c$ of a metal that is not acted upon by the liquid on the positive side of the porous partition, and that is not subject to be reduced by local galvanic action. I employ for this purpose a plate of copper coated with quicksilver for the purpose of changing its polarity. A copper plate by reason of its negative   a  ty would set up a local action with an adjacent zinc plate, thereby rapidly disintegrating the latter and causing a waste of energy; but by coating the copper with mercury its polarity is changed from a negative to a positive state, so that it becomes neutral relatively to the zinc element. This combination of copper and mercury for forming a neutral support and submerged electric connection for the positive plate in primary batteries I believe to be a novel feature. The connections are made by a wire $d$, soldered to the plate $c$ and passing out through the layer of wax and through the bottom of the vessel. The connection with the negative electrode is made by a wire $e$ connected electrically to the bottom of the carbon cup and passing out through the bottom of the vessel. Where the cells are connected in series, the wires $e$ and $d$ are joined together beneath the bottom of the cells, as shown in Fig. 1.

Galvanic batteries in operation give off noxious fumes, which it is desirable to neutralize or absorb. These fumes consist chiefly of nitrous-oxide gas. To eliminate these fumes I provide a cover B, which is constructed in the form of a tray, having a wooden frame or outer portion $f$ and a bottom $g$. This bottom fits down closely over the upper end of the porous tube C, and is perforated after the manner of a colander at $h$, where it stands over the space inclosed by the porous tube, so that the fumes evolved from the liquid or electrolyte in the negative compartment of the battery may ascend through the perforations into the tray above. In this tray is placed any suitable material, which will be absorbent of or capable of neutralizing these fumes. I employ for this purpose, by preference, metallic salts, such as the salts of manganese, copper, and iron, the most convenient being the common sulphate of iron in small crystals. The nitrous-oxide fumes ascending from the battery pass into the tray, where they are brought in contact with the salts, and their escape therefrom is prevented by a cover $i$, which is fastened down over the tray.

I claim as my invention the following defined novel features or improvements substantially as hereinbefore specified, namely:

1. In a galvanic battery, a cell, a porous cup consisting of an earthenware tube open at both ends arranged with its lower end at the bottom of the cell and a sealing substance around its lower end joining it to the bottom of the cell, whereby its lower end is closed and it is fastened in position in the cell.

2. A galvanic-battery cell having a layer of wax on its bottom and an open-ended tube of porous earthenware with its bottom end sealed in said layer of wax to constitute the porous cup.

3. A galvanic-battery cell comprising a carbon cup as the negative electrode, an open-ended tube of porous earthenware inclosing said cup, and a sealing layer of wax on the bottom of the cell closing the bottom of said earthenware tube and securing the carbon cup in place.

4. In a galvanic battery, the combination of the battery-cell, an upright negative electrode, a connection-plate of copper coated with mercury arranged within the cell to be submerged in the electrolyte, a circuit-conductor leading from said plate, and an upright positive electrode arranged to rest upon and make contact with said plate beneath the surface of the electrolyte, whereby it is connected with said conductor.

5. In a galvanic battery, the combination of the battery-cell, the upright negative electrode, the upright positive electrode, a connection-plate of copper coated with mercury arranged at the lower part of the cell beneath and supporting the positive electrode, and a circuit-conductor leading from said plate, whereby said plate constitutes a submerged connection for joining the positive electrode to the circuit in such manner that the connection is made by simply placing the electrolyte in the cell so that it shall rest upon said plate, and whereby, also, local action between said plate and the positive electrode is prevented.

6. The combination, with a galvanic-battery cell, of a chamber arranged over the cell to receive the fumes therefrom and containing a substance capable of absorbing or neutralizing said fumes.

7. The combination, with a galvanic-battery cell, of a cover therefor constructed to constitute a chamber in communication with the battery-cell and adapted to contain a substance for neutralizing or absorbing the fumes from the cell.

8. The combination, with a galvanic battery, of a chamber arranged thereover containing solid metallic salts for absorbing the gases generated in the battery.

9. The combination, with a galvanic battery, of a chamber arranged thereover containing the salts of iron, copper, or manganese to absorb the gases generated in the battery.

10. The combination, with a galvanic-battery cell, of a cover fitting over said cell constructed with a tray which is formed with perforations communicating with the positive compartment of the battery and adapted to admit fumes from said compartment into the tray, a substance in said tray capable of absorbing or neutralizing said fumes, and a cover for inclosing the top of said tray to confine the fumes therein.

In witness whereof I have hereunto signed my name in the presence of two subscribing witnesses.

WALTER AMBUS CROWDUS.

Witnesses:
 GEORGE H. FRASER,
 FRED WHITE.